United States Patent [19]
Brulhart

[11] Patent Number: 5,100,550
[45] Date of Patent: Mar. 31, 1992

[54] FILTER NOZZLE WITH ANNULAR FILTER DISCS

[75] Inventor: Paul Brulhart, Winterthur, Switzerland

[73] Assignee: Walter Furrer, Kusnach, Switzerland

[21] Appl. No.: 428,203

[22] Filed: Oct. 27, 1989

[30] Foreign Application Priority Data

Nov. 2, 1988 [CH] Switzerland .......................... 4072/88

[51] Int. Cl.⁵ ............................................ B01D 29/39
[52] U.S. Cl. ................................ 210/322; 210/333.01; 210/345; 210/461; 210/488; 210/498
[58] Field of Search ................ 210/322, 345, 333.01, 210/449, 461, 488, 498

[56] References Cited

U.S. PATENT DOCUMENTS

| | | |
|---|---|---|
| 2,118,295 | 5/1938 | Crawford et al. .................. 210/488 |
| 3,700,111 | 10/1972 | Bode .................... 210/322 |
| 3,784,015 | 1/1974 | Kasten . |
| 4,267,045 | 5/1981 | Hoof . |
| 4,709,863 | 12/1987 | Szkoradek et al. ............. 210/488 X |

FOREIGN PATENT DOCUMENTS 52363 6/1967 Australia .
2037601 7/1980 United Kingdom .

Primary Examiner—Charles Hart
Attorney, Agent, or Firm—Nilles & Nilles

[57] ABSTRACT

A filter nozzle equipped with annular filter discs which establish flow paths (26, 28), serving to conduct the filter liquid and which paths are radial (28) and also penetrate through (26) the filter discs (18). These passages (26) through the filter discs (18) are in themselves formed as passages (26) that become narrow in the flow direction of the filtered water, and are distributed uniformly over the disc (18). The discs (18) have projections which ensure that the passages (26) of two adjacent discs are not in alignment. With such a filter nozzle, the danger of blockage is much less than with known nozzles, assuring a steady operation and requiring less frequent cleaning.

5 Claims, 5 Drawing Sheets

FILTER NOZZLE WITH ANNULAR FILTER DISCS

BACKGROUND OF THE INVENTION

1. Field of the Invention

The present invention relates to a filter nozzle with annular filter discs that is provided with flow passages which are radial and which also penetrate the filter discs to serve for conducting the filter liquid.

2. DESCRIPTION OF THE PRIOR ART

For serving the public with drinking and industrial water as well as for the purification of waste water, ever increasing numbers of water treatment systems are being installed. Their purpose is the separation of suspended matter from raw water. These treatment systems—so-called fast filters—mostly consist of one or more open filtering basins or of tanks in closed filters. The filter nozzles are built into the false bottom. On the one hand these filter nozzles have the function during the filtering process of holding back the filter medium and allowing the water to flow through. On the other hand, during the backwashing process the filter medium must be cleaned by means of an opposite stream of rinse water and often of scavenging air. Normally, fine-grain sand serves as the filter medium.

For this purpose the false bottom is furnished with a large number of these filter nozzles. These make possible a good distribution across the entire filter zone of the water to be filtered or of the rinse water or scavenging air. In themselves, these filter nozzles have already been known for many years. They are built in the most diverse ways and more or less satisfy their purposes. In most recent times, the composition of the filter materials has often been changed with respect to quality and/or grain coarseness.

As a consequence of this, the reduced raw water qualities and the higher demands on the filter must be compensated for with higher backwashing parameters, particularly increased rinse water velocities. Connected with this are difficulties with the conventional filter nozzles, which are not satisfactory for these new, increased requirements.

A known phenomenon is the blocking or sedimentation of the filter nozzle due to lodgement of foreign bodies or deposits within the filter nozzle itself. This results in a reduction of the through-flow of water, but also a deterioration of the backwashing process by reason of higher pressure drop in the filter nozzle—and by this there is brought about a change in the working point of the scavenging pump and/or the scavenging blower. The backwashing machines, designed on the basis of the resistance of unblocked nozzles, no longer provide the expected through-flow and therefore no good cleaning action of the backwashing medium. The quality of the filtrate is thereby negatively influenced. With the higher rinsing pressures that have, with time, come to be often used, numerous conventional filter nozzles fulfill their function only partially. In extreme cases the filter nozzles must from time to time be removed and cleaned at great cost. A known type of filter nozzle with superimposed discs, with spacer pins and horizontal slits, has brought an improvement. In this filter nozzle the flow takes place in one or the other direction through the spaces between the stacked discs. These spaces are larger than the slits themselves, so that due to the decrease in velocity a deposition of materials is possible. These materials are mostly particles which are whirled up during backwashing due to the higher velocity of the rinse water in the lower portion of the filter mass.

A filter nozzle described in Australian 52 363/64 is provided with annular filter discs. These filter discs are forced over a central pipe-shaped carrier. The filter discs are provided with projections in the region of their outer peripheries in order to leave free passage openings between two adjacent rings. The rings are further so formed that an outer periphery forms a radially inwardly widening passage space, as well as a separate inner passage space, likewise widening radially inwardly, and in this these passage spaces are separated from one another by an inlaid ring, which ring is intended to give the filter disc support an increased mechanical stability.

In order to be able to conduct water that enters the outer annular space radially into the inner annular space, both the filter discs and the intermediate ring are provided with openings parallel to the axis.

The inner annular chambers are connected, by means of longitudinal slits in the wall of the central pipe-shaped carrier, with the hollow interior of this carrier, so that the water that flows through the inner chamber ahead of it is conducted for radial flow through the outer chamber, then for flow parallel to the axis through the openings that are parallel to the axis, and finally radially into the pipe-shaped carrier. The smallest filtering openings for inflow of the water to be purified are the peripherally outer slits of the successive filter discs, while the through-flow cross sections enlarge towards the pipe-shaped carrier, which has the result that these filter nozzles present an extremely small pressure drop, but on the other hand exhibit the disadvantage that unfiltered finest particles can deposit in the interior upon the filter discs, particularly because of the retarded velocity of water through-flow. From this, as is noted in the description, there is an absolute requirement for cleaning of the filter interior from time to time by backwashing.

In another known construction (Great Britain, 2,037,601) there is described a filter nozzle with annular filter discs wherein suitable spacers are provided to make possible the admission of water between the filter discs for entry to the filter nozzle. In this the exclusion of the correspondingly small particles takes place on the outer surfaces of the filter discs. The inner chamber between the individual filter discs is enlarged by means of recesses in cross section, so that in this chamber there prevails a reduced stream velocity relative to the inflow velocity, which leads to a stoppage of the water between the discs as a result of the relatively narrow bore in the central portion, which has a central outlet opening with lateral bores. Through this, fine particles that are not filtered out seat themselves between the filter discs, which liquid backwashing of the filter guards against clogging.

In another construction (U.S. Pat. No. 4,267,045) there is described a filter nozzle with annular filter discs, in which nozzle likewise there is achieved a purely radial flow through the free space provided between the aggregated filter discs, radially towards the middle. With this, suitable elements provide for a constant change of direction, as in a maze, of the water that still contains the fine particles but is otherwise filtered. This has the disadvantage that this constant change of direction of the water running through it, with corresponding vortex generation and dead water zones, promotes a deposition of the fine particles, so that with this construction, too, a liquid backwashing is absolutely necessary to guard these spaces between the filter discs from blockages and precipitation out of the filter nozzle.

In a further prior publication (U.S. Pat. No. 3,784,015) there is provided a filter nozzle with filter discs that are arranged parallel to one another, which are so formed that between two successive discs a predetermined laminar flow of the water to be purified is assured, wherein centrifugal forces operate which deposit the particles in suitable pockets provided for them, and for the rest keep open the throughflow cross section for the water. A construction of this type requires, however, an emptying of the respective pockets, which is not possible in a simple manner. For this reason such a filter is not suitable for purification of large quantities of water.

The surfaces exposed to a deposit of solid materials, particularly the crosspieces of the filter rings, are dimensioned to be extremely small.

SUMMARY OF THE PRESENT INVENTION

The purpose of the present invention is to provide a filter nozzle that has a lesser danger of blockage than any of the known nozzles and which therefore assures a more regular operation as well as demanding less frequent cleaning.

DESCRIPTION OF A PREFERRED EMBODIMENT

Figure 1:
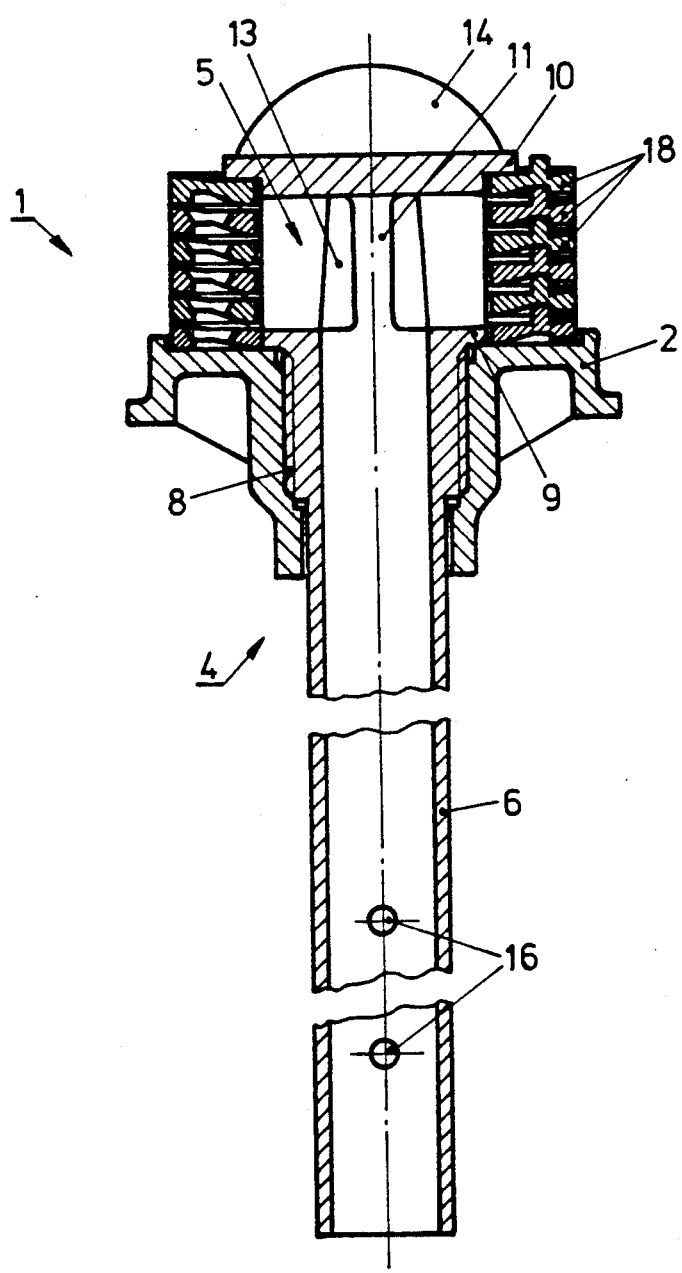
FIG. 1 is an axial section through a filter nozzle built into the false bottom of a filter basin or filter tank for filtering or for holding back the filter medium, for example, sand.
Figure 2:
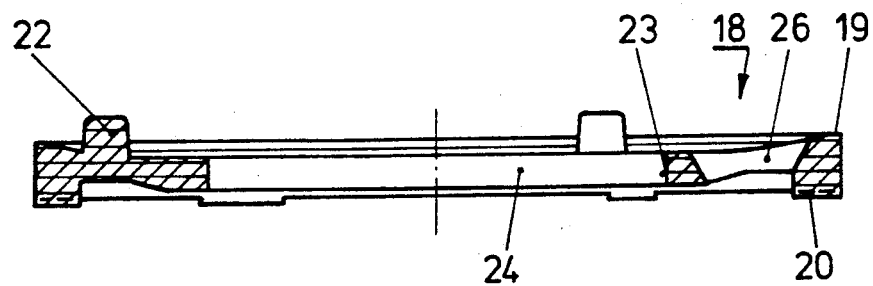
FIG. 2 is an axial section through a disc of a filter nozzle.
Figure 3:
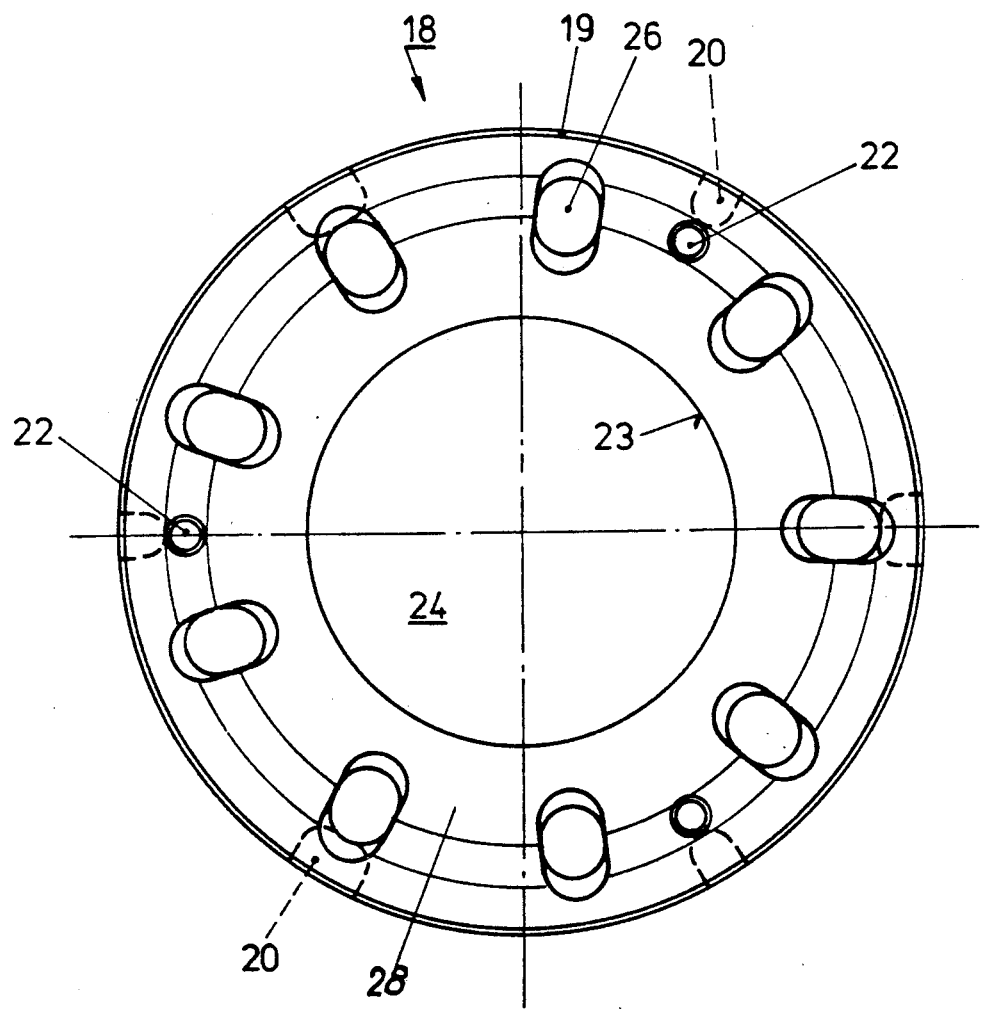
FIG. 3 is a plan view of the disc shown in FIG. 2.

FIG. 1 shows a mounted filter nozzle 1, which is screwed into a holder 2 cemented into a false bottom. The filter nozzle comprises a carrier 4 with a head portion 5 and an outlet duct 6. There are openings 13 in the bottom portion of the head portion, so that the water is constrained to flow in the axial direction. The carrier 4 is unitary and is preferably made of plastic. Beneath the head portion 5 there is a thread 8 that serves for securing the filter nozzle 1 in the holder 2 and makes possible an easy insertion of the filter nozzle 1 from above. The filter nozzle 1 lies with its supporting flange 9 on the upper sealing surface of the holder 2, while an upper sealing flange 10 of the head portion 5 serves for preventing the unclamping of the discs 18 that belong to the filter nozzle 1. In FIG. 1 the discs 18 are shown with self-covering axial passages. In practice they are displaced relative to one another, so that there is imparted to the water a velocity component in the circumferential direction. Between the supporting flange 9 and the upper sealing flange 10 there are four ribs 11 arranged in the form of a cross, the spaces 13 between them serving for the flow of the purified water to the outlet duct 6. The upper seal of the head portion 5 forms a cross-shaped finger grip 14 which facilitates screwing the filter nozzle 1 in and out. The outlet duct 6 is provided in its lower portion with two backwash openings 16 through which backwash pressure water or backwash pressure air can be introduced.

Figure 6:
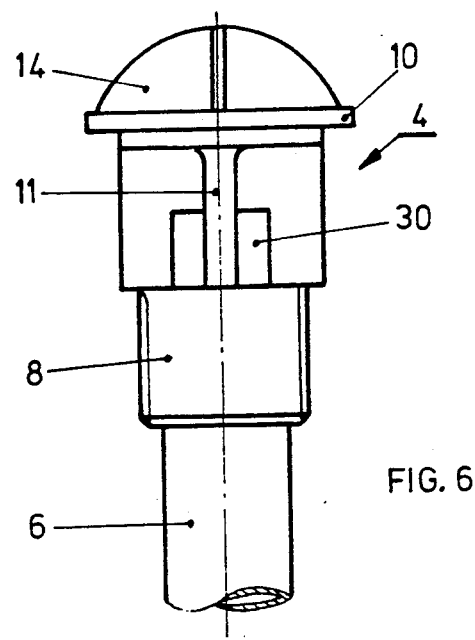
FIG. 6 shows the head portion of a pipe-shaped filter nozzle carrier.

It can be advantageous to narrow the upper portions of the spaces 13, or to close them completely, in order to permit the water that enters the upper discs to flow only partly, or not at all, into the outlet duct 6, as is shown in FIG. 6 with the openings 30. The free cross section can, for example, increase downwardly proportionally to the particular number of discs.

The filtering portion of the filter nozzle 1 is assembled from a plurality of discs 18, the outer rims of which are formed as filtering rims 19. Spacer pins 16 distributed around the periphery, which project axially above the filter rim 19, establish the distance between two neighboring discs 18. They thereby define the width of the filtering ring slot 27, which pressents the narrowest cross section to the water to be purified and thereby performs the filter function of holding back the filter medium, for example sand. Over the periphery, radially inwardly offset, are distributed centering knobs 22, which prevent radial sliding of the superimposed discs 18. The inner rim 23, which surrounds the inner opening 24, can be somewhat raised in relation to the inner channel 28 lying between the outer filtering rim 19 and the inner rim 23.

Figure 4:
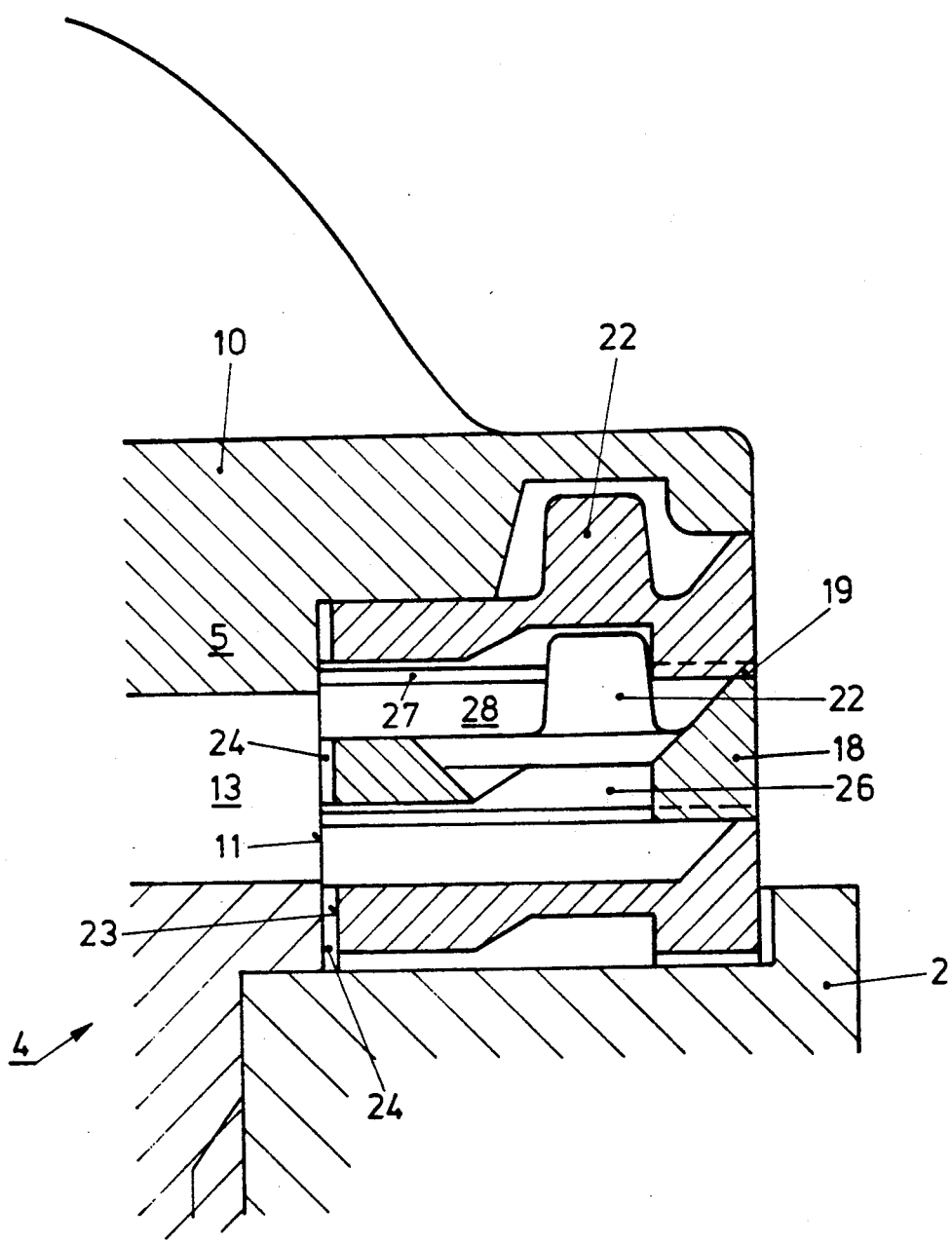
FIG. 4 is an enlarged section of the head portion of a filter nozzle analogous to FIG. 1, with mounted discs.
Figure 5:
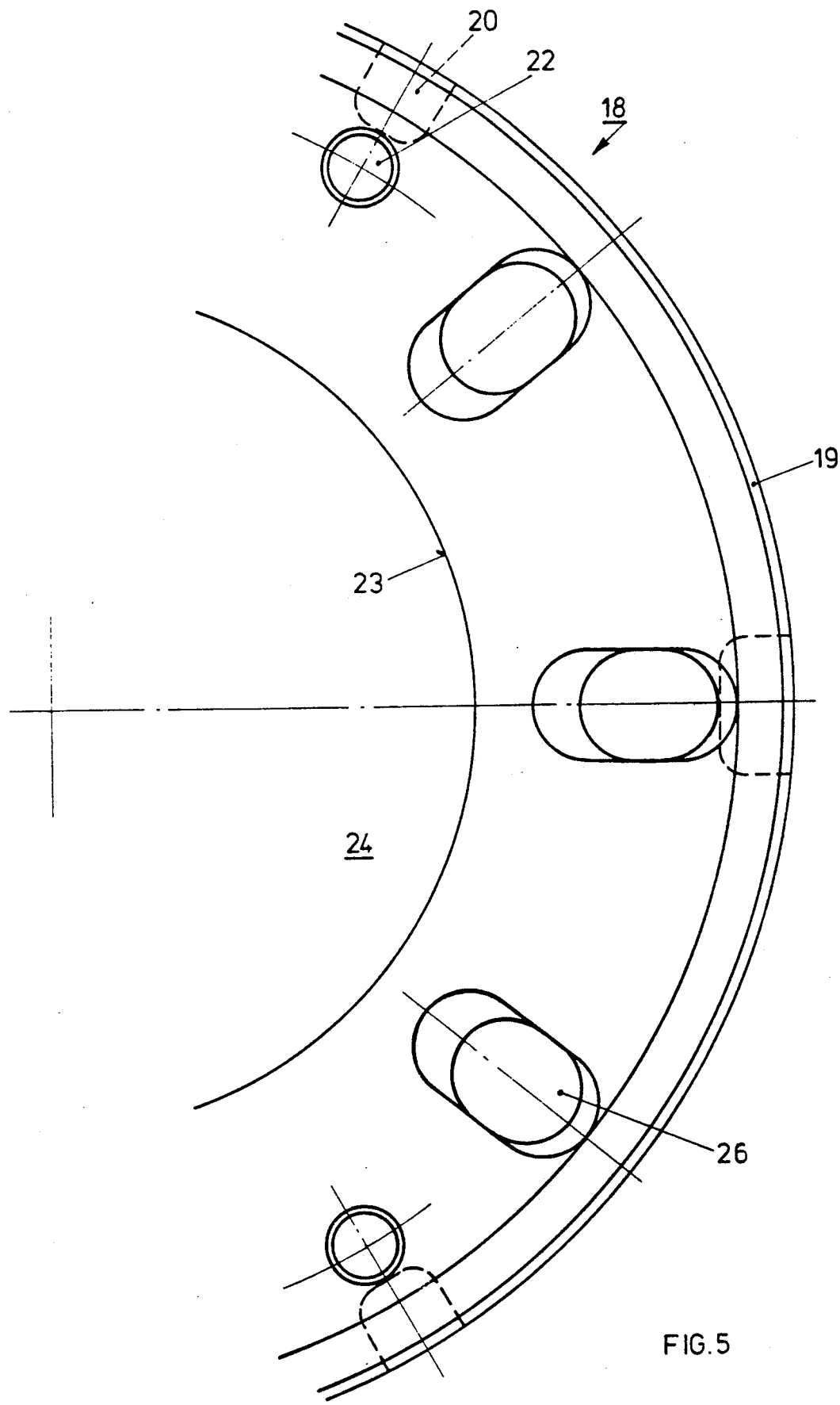
FIG. 5 is a section of the disc shown in FIG. 3.

Of greater importance is the fact that between the rims 19 and 23, as particularly shown in FIGS. 4 and 5, there are arranged passages 26 which allow the purified water that has flowed through the filtering slot 27 to flow at least in part lengthwise of the filter nozzle 1, whereby the danger of deposits, particularly of suspended matter, is reduced. Depending upon the form of the inner rim 23 and the intermediate spaces 13 between the ribs 11, more or less of the water also arrives in the outlet duct 6.

With respect to the passages 26, these are normally narrowed towards their bottoms, that is, in the direction of flow, in order that here, too, the danger of settling of foreign matter is prevented by means of an accelerated flow. With this it is also possible by means of additional installations in the inner channel 28 to guide the path of the water, for example from the filtering ring slot 27 towards the entry to the through passages, to avoid a swirl. These through passages could also have constant cross sections of any reasonable form.

It is further possible, by a suitable formation of the upper and lower sides of the discs, to so dimension the inner channel 28 in its cross section as to assure an essentially constant velocity of the outflowing water.

In contrast to FIG. 1, by assembling the filter nozzle 1 with, for example, suitable stops, with the help of the centering knobs 22, the passages 26 can be caused to be displaced circumferentially from one disc 18 to the next, to maintain the stream of water suitably turbulent by deflections in its flow through the discs, and thereby assure the cleaning of the discs in a natural manner.

It is therefore achieved that the flow is not only horizontal between the outer rim and the discharge duct but is also vertical and occasionally formed with tangential components.

A deposit of materials in the path of the water or of backwash water and scavenging air can no longer take place in the flow channels of the discs. Moreover, because the passages from one disc to another lie at random, there occurs due to the flow from one passage to the next a certain cleansing action upon the particulate matter that would be deposited in any event.

Due to this the properties of the filter nozzle remain practically constant through time, since a change in the operating conditions of the existing filter device no longer intrudes.

FIG. 6 shows the head portion of a pipe-shaped carrier 4 for a filter nozzle wherein the central openings extend along only a portion of its length and are designated by the suitable openings 30. In this manner there is obtained a certain stagnation in the space between the filter discs through which the water flows, dependent upon the relatively narrow cross section of these openings 30, and with this a constancy in the velocity of the water after its entry into the filter nozzle.

Figure 7:
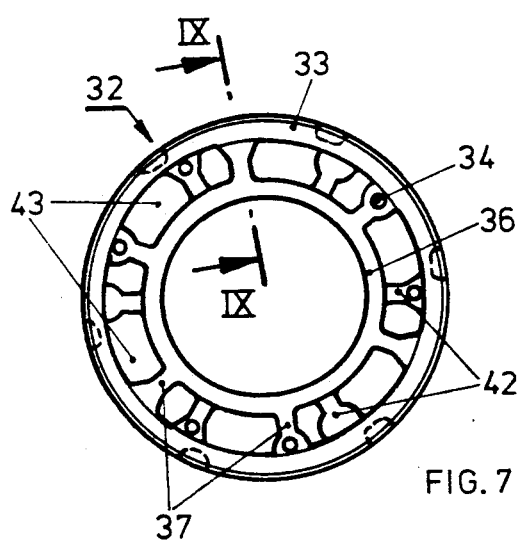
FIG. 7 is a plan view of a pair of superimposed filter discs in different angular positions.
Figure 8:
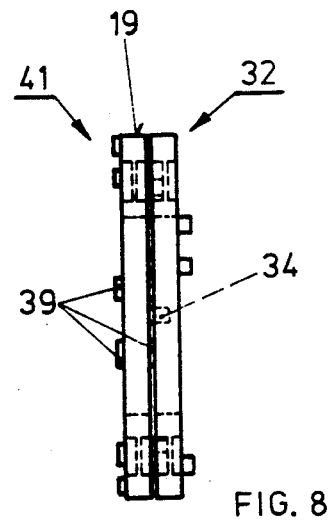
FIG. 8 is a side view of the two filter discs shown in FIG. 7.
Figure 9:
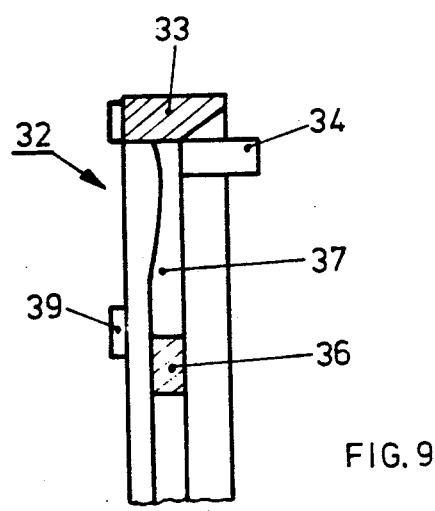
FIG. 9 is a section on the plane of the line IX—IX through one of the filter elements shown in FIG. 7.

FIGS. 7 to 9 show a further development of filter discs. The one filter disc 32 has a rim ring 33 as well as centering knobs 34. Its inner ring 36 is connected by means of straps 37 with the rim ring 33. Spacer knobs 39 establish the passage slot between two superimposed discs, as is indicated in FIG. 8. With this a second filter disc 41 has its straps 42 circumferentially displaced in relation to the straps 37 of the filter disc 32. The result of this is that the incoming water flows partially radially through the corresponding channels between the two discs 32 and 41, while one portion flows out in the radial direction through the circumferential openings 43. This has as a consequence—owing to the angular displacement of the two filter discs 32 and 41, which displacement arises automatically during assembly—that the water has a tangential component which floats away possible deposits of fine material upon the individual straps and thereby effects a constant self cleaning of the nozzle or the filter discs.

The otherwise radial flow velocities are so selected by means of suitable dimensioning of the cross section that here too possible lodged particles are carried off again by the flow. Such lodging can occur when the action of water upon the filter is kept below a certain water quantity and with this the predetermined velocities in the filter nozzle are no longer assured.

All of the individual parts and individual features set forth in the description and/or the figures, as well as their permutations, combinations and variations are inventive, and in fact for n individual parts and individual features with the value $n=1$ to $n\rightarrow\infty$.

What is claimed is:

1. A filter nozzle (1) including annular filter discs (18) having radial flow paths which penetrate through the filter discs and which serve for conducting filtered liquid, characterized in that the filter discs have means for assuring flow paths that produce tangential velocity components of the liquid.

2. The filter nozzle according to claim 1, characterized in that the radial flow paths (28) have guide means for conducting the water to the passages (26) that penetrate through the filter discs (18), for additionally setting the water into rotation.

3. A filter nozzle, according to claim 1, characterized in that the passages (26) of said filter disc (18) are preferably formed as narrowed passages (26) in the direction of flow of the filtered water, said narrowed passages being uniformly distributed on the disc (18).

4. A filter nozzle according to claim 1, characterized in that the discs (18) have means which ensure that said passages (26) of two neighboring discs are not in alignment.

5. A filter nozzle according to claim 1, characterized in that said flow paths (28) of said filter discs are so dimensioned in the flow cross section to provide approximately uniform absolute value of stream velocity therein.

* * * * *